350-376
SR
XR 3,478,334
4031 T
4029 D
SEARCH ROOM

Nov. 11, 1969 H. J. KUMP 3,478,334

LOW THRESHOLD MAGNETIC FILM MEMORY

Filed June 29, 1964 3 Sheets-Sheet 1

INVENTOR
HERBERT J. KUMP

BY [signature]

ATTORNEY

3478334
OR IN 365/118

INVENTOR.
HERBERT J. KUMP
BY [signature]
ATTORNEY

INVENTOR.
HERBERT J. KUMP

BY

ATTORNEY

United States Patent Office 3,478,334
Patented Nov. 11, 1969

3,478,334
LOW THRESHOLD MAGNETIC FILM MEMORY
Herbert J. Kump Poughkeepsie, N.Y., assignor to International Business Machines Corporation, New York, N.Y., a corporation of New York
Filed June 29, 1964, Ser. No. 378,806
Int. Cl. G11b 5/02
U.S. Cl. 340—174 16 Claims

ABSTRACT OF THE DISCLOSURE

A uniaxial anisotropic magnetic film storage device operating in the dispersion locked mode and unlocked from remanence along a hard axis by the application of a magnetic field directed generally opposite to the remanent magnetization along the hard axis. A first bias field directed generallly opposite to the remanent magnetization along the hard axis of a strength insufficient to unlock the device may be employed so that, when unlocking is desired, an additional low amplitude magnetic field, such as that generated by an electron beam, may be applied in the same direction as the first bias field to unlock the device from remanence along the hard axis. A second bias field applied along the easy axis may be utilized to provide remanence in one of two opposite directions along the easy axis following unlocking from hard axis remanence.

BACKGROUND OF THE INVENTION

This invention relates to magnetic film data storage devices and, particularly, to a uniaxial anisotropic magnetic film storage device operating in the dispersion locked mode and capable of being set to information states by a low strength magnetic field.

More particularly, the invention relates to a dispersion locked magnetic film storage device capable of being switched from remanence along a hard axis to a selected remanence condition along an easy axis by the application of a low amplitude magnetic field, such as that generated by an electron beam, directed generally opposite to the remanent magnetization along the hard axis, together with a selecting magnetic field along the easy axis, or switched from remanence to a split easy state by the application of a low amplitude magnetic field applied in the hard direction opposite to the remanent magnetization.

A dispersion locked magnetic film memory is disclosed in a copending application of Bertelsen, Hottenrott and Kump, Dispersion Locked Memory, Ser. No. 334,858, filed Dec. 31, 1963, and assigned to the assignee of the present application. A uniaxial anisotropic magnetic film theoretically is capable of remanent magnetization only in an "easy direction" along its so-called "easy axis." The magnetization may be remanent wholly in one easy direction or the other, or the magnetization may be split between the two easy directions with a net remanence approaching zero. However, because of dispersion, i.e., the difference in directions of easy axes of the individual dipoles in a uniaxial anisotropic magnetic film, it is possible to have a remanent state along a hard direction axis typically at 90° to the easy axis. The copending Bertelsen et al. application describes the effect of dispersion in detail, and utilizes "dispersion locking" or remanence along a hard axis to provide a memory element for binary information storage. A region of the film constitutes a single element, and remanence along the hard axis in the region represents a binary "zero," for example, while remanence along the easy axis represents a binary "one."

In the Bertelsen et al. application, the switching of a remanent state in a film region from the hard axis to the easy axis is accomplished by the application of concurrent fields to the region, one along the hard axis and the other along the easy axis. The easy axis field by itself is insufficient to switch the region from remanence along the hard axis to the easy axis. However, the fields together are sufficient to cause such switching.

The requirement of concurrent orthogonal fields for switching presents a few problems. First, the magnetic field strength necessary to swtich from remanence along a hard axis to the easy axis using orthogonal fields is relatively high, and hence a switching source of considerable magnetic field strength is required. Second, although concurrence is desirable when orthogonal fields are employed since such fields select a particular region from one of a plurality of regions in a matrix, this requires at least two signal lines or channels which complicates the switching system.

Accordingly, it is an object of the invention to switch a region in a uniaxial anisotropic magnetic film from a state of remanence along a hard axis to a state of remanence along an easy axis by the application of magnetic field of relatively low strength.

It is a further object of the present invention to switch a region in a uniaxial anisotropic magnetic film out of remanence along the hard axis by a single low amplitude field.

It is another object to switch a magnetic film through the mechanism of the magnetic field produced by an electron beam.

BRIEF DESCRIPTION OF THE INVENTION

In the present invention, the switching of a region of a uniaxial anisotropic magnetic film out of remanence along the hard axis is accomplished by the application of a field along the hard axis in a direction opposite from the direction of hard axis remanence. Such a technique takes advantage of the low threshold that may be exhibited by uniaxial anisotropic magnetic films that are dispersion locked in remanence in the hard direction. Specifically, it has been found that remanence along the hard axis may be switched by a field of relatively low strength, of the order of 0.01 oersted, applied in the opposite direction along the hard axis. When the unlocking threshold is reached, the remanent hard axis magnetization switches to nearly zero at the very high speed of rotation of magnetic dipoles in the region, and the region may assume a remanence along the easy axis in either direction along that axis or may exist in the split state. If it is preferred to establish an easy axis remanence in one direction only, a small bias field may be employed to ensure that, as the region is unlocked from remanence in the hard direction, remanence in the preferred easy direction is assumed.

Because of the low field strength necessary to unlock the region from remanence along the hard axis, the switching can be achieved through the use of the magnetic field accompanying an electron beam. Although electron beams have been used in the past for the switching of magnetic memory elements, the primary switching mechanism has been the heating effect of the beam. An example of heat switching in Patent No. 3,094,699, issued on June 18, 1963 to E. J. Supernowicz. As disclosed in that patent, the time of impingement of the beam on the element is roughly eight microseconds, which places a severe limitation on the speed at which the system can operate. In the present invention, the electron beam impinges on a magnetic thin film region only so long as to allow the region to be unlocked from remanence in the hard direction, the primary switching mechanism being the magnetic field accompanying the beam. It is, of course, recognized that some heat must accompanying the beam; however, the heating of the region is so slight as to render the switching dependent upon the magnetic field of the beam. Such switching occurs on the order of nanoseconds rather than microseconds, and hence the data handling capabilities of the system with magnetic switching are greatly increased over a system with heat switching.

The use of an electron beam naturally avoids the requirement of concurrent fields for the selection of a region for switching, as required in the Bertelsen et al. application referred to above. The principles of the present invention, however, are applicable to concurrent orthogonal fields used for selection and switching when this is desirable. Hence the switching can be by virtue of the magnetic field associated with a pair of conductors rather than with an electron beam. In this case, any two conductors define only one region and pass by the region parallel to each other rather than perpendicular to each other as in the Bertelsen et al. application. The field necessary to cause unlocking and which is produced by current passing through the conductors is relatively low, and hence the driving requirements for switching are greatly relaxed. Thus small currents suffice to unlock the regions from remanence along the hard axis.

The switching of a uniaxial anisotropic magnetic region locked in remanence along a hard axis may be facilitated by the use of a bias field along the hard axis and in a direction opposite from the direction of hard axis remanence. Such a bias field is of sufficient magnitude to approach but not equal the unlocking or switching threshold required to switch the region out of remanent magnetism along the hard axis. Subsequently, an additional control field is applied to the region in the same direction as the bias field but of a low magnitude sufficient only to exceed the unlocking or switching threshold of the region when combined with the bias field. The bias field then permits the use of a small control field to switch a region out of remanence along the hard axis when the threshold is higher than the magnetic field provided by the control field alone.

The data stored in a thin magnetic film may be read out by a number of techniques. In the case where the thin film is set with information by an electron beam, and no conductors through the film are used, optical readout principles may be employed. For example, a laser element producing a beam of polarized light may be employed, with the light directed to any particular region to be read out. Depending upon the orientation of the dipoles in the region, i.e., whether they are along the hard axis or along the easy axis, the polarized light is rotated different degrees An analyzer may be positioned to receive the rotated light from a region whose orientation is along the easy axis, representative of the binary value of one, for example. A photomultiplier may receive light from the analyzer to generate a suitable output signal.

When the magnetic film incorporates conductors to carry signal current to unlock the different regions in the film out of remanence along the hard axis, one of the conductors may be used for the purpose of read-out.

BRIEF DESCRIPTION OF THE DRAWINGS

The foregoing and other objects, features and advantages of the invention will be apparent from the following more particular description of preferred embodiments of the invention, as illustrated in the accompanying drawings. In the drawings.

DETAILED DESCRIPTION OF THE INVENTION

Figure 1:
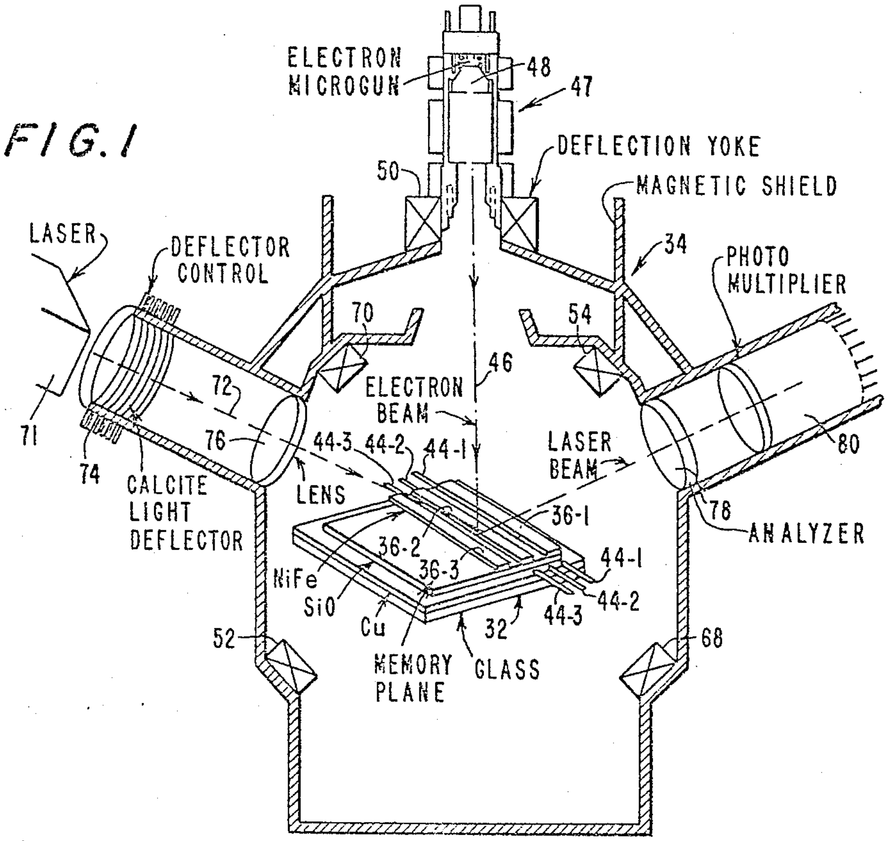
FIG. 1 is a pictorial representation of a magnetic film memory system in accordance with the invention, including an electron beam arrangement for recording information and an optical arrangement for reading out the recorded information.

Referring now to the figures, the invention is embodied in a system such as that shown in FIG. 1, which utilizes regions of uniaxial anisotropic magnetic film strips as storage elements. The regions are arranged to be selectively locked in remanent magnetism along hard axes to represent items of binary information having the value of zero, for example. The regions are also adapted to be selectively unlocked or switched from remanence along the hard axes to remanence along easy axes (in one or both directions along such axes) by the application to each of the selected regions of a low amplitude magnetic field in a direction generally opposite from the direction of remanent magnetization along the hard axis of the region. The remanent magnetization along the easy axis in a region is representative of a binary bit of information having a value of one, for example. Suitable provision is made to read out the information from the film regions.

Figures 2, 3, 4:
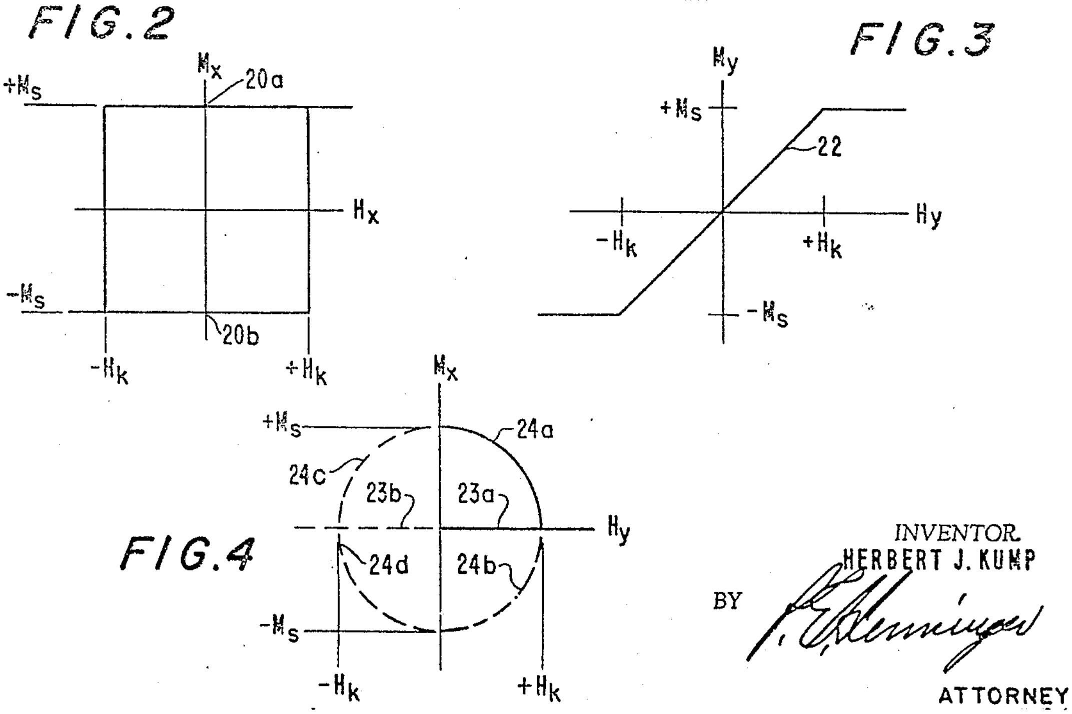
FIGS. 2 and 3 are ideal curves for a region of a uniaxial anisotropic magnetic film showing magnetization along the easy and hard axes, respectively, as a function of field strength along the easy and hard axes, respectively.
FIG. 4 illustrates ideal cross field curves showing magnetization along the easy axis as a function of field strength along the hard axis, with a relatively small coincident field along the easy axis for each curve for the uniaxial anisotropic magnetic film region having the easy axis and hard axis magnetization-applied field curves of FIGS. 2 and 3.

Before discussing FIG. 1 in detail, however, it is best to refer to FIGS. 2–7, which explain the theory of operation of the invention. FIG. 2 is an ideal hysteresis curve for a region of a uniaxial anisotropic magnetic film showing $M_x$, magnetization along the easy axis, as a function of $H_x$, field strength along the easy axis. $H_k$ is defined as the anisotropy field, and when the applied field along the easy axis exceeds $+H_k$, assuming wall motion is prohibited, saturation occurs with the magnetization along the easy axis being constant at a value $+M_s$ (or $-M_s$ when $H_x$ is less than $-H_k$). Walls in a magnetic film are defined as boundaries between regions in which the magnetic dipoles are oriented in different directions. Wall motion, i.e., the movement of such boundaries, is relatively slow and occurs when the magnetic film is switched from saturation in one direction to saturation in the opposite direction in a time which is roughly less than one microsecond. Wall motion generally cannot take place when the switching time is less than 100 nanoseconds. In FIG. 2, when the applied field along the easy axis is brought to zero from a value greater than $+H_k$ or less than $-H_k$, the magnetism in the film region is remanent at $+M_s$ or $-M_s$, respectively, as represented by the points *20a* and *20b*, respectively.

FIG. 3 is an ideal curve for the same uniaxial anisotropic magnetic film region, showing $M_y$, magnetization along the hard axis, as a function of $H_y$, the field strength along the hard axis. In this case, the curve is a sloping straight line 22 between the values $-H_k$ and $+H_k$. When $H_y$ exceeds $+H_k$, saturation occurs with the magnetization along the hard axis being constant at $+M_s$ (or $-M_s$ when $H_y$ is less than $-H_k$). It will be noted that no hysteresis is present in the curve of FIG. 3, and hence when the applied field $H_y$ is brought to zero from a value greater than $+H_k$ or less than $-H_k$, the magnetization $M_y$ along the hard axis is also brought to zero, with no remanent magnetization existing along this axis.

FIG. 4 illustrates ideal cross field curves for the uniaxial anisotropic magnetic film region having the easy axis and hard axis magnetization-applied field curves of FIGS. 2 and 3, and shows $M_x$, magnetization along the easy axis, as a function of $H_y$, field strength along the hard axis (with a small coincident easy axis field for each curve).

To explain FIG. 4, it is assumed at the outset that the magnetic film region is subjected to no applied fields either along the easy axis or along the hard axis, and that the dipoles in the region are oriented in both directions along the easy axis to present a net magnetization of zero along that axis. In FIG. 4, the magnetic state of the film is represented by the origin, i.e., the intersection of the $M_x$ and $H_y$ axes. If a field is applied along the hard axis in the positive direction, for example, the magnetic state of the element is represented by the curve segment designated **23*a*** in the figure. Magnetization along the easy axis remains zero, and the applied field along the hard axis may be increased until the field exceeds $+H_k$, at which point the magnetization in the film region is oriented entirely along the hard axis. No magnetization along the easy axis is exhibited.

At this time a small field is applied along the easy axis in the positive direction, for example, to influence the direction of easy axis magnetization. Next the applied field along the hard axis is reduced from a magnitude exceeding $+H_k$ to less than $+H_k$. As this occurs, the magnetic dipoles in the region rotate toward the easy axis in the positive direction, and the magnetization follows the curve segment designated **24*a*** until the magnetization is completely in the easy direction and at a remanent state of $+M_s$ when the applied fields along the hard axis and along the easy axis are reduced to zero.

If it is desired to return to a magnetic state in which the dipoles are oriented in both directions along the easy axis to present a net easy axis remanent magnetization of zero, a field is again applied along the hard axis in the positive direction or in the negative direction so as to cause the magnetization to rotate from the remanent easy axis state $+M_s$ completely into the hard direction along the curve segment **24*a* or 24*c*, respectively. When the hard axis field exceeds $H_k$, the easy axis magnetization is reduced to zero. Thereafter, the field along the hard axis is reduced to zero, and the magnetization follows the curve 23*a* or 23*b*** respectively to the origin.

The curve **23*a* and the dashed line curve 24*b* together illustrate the operation of the magnetic film region for a positive hard axis applied field but with a small easy axis field applied in the negative direction to produce remanent easy axis magnetization—$M_s$. The dashed line curves 23*b* and 24*c* together illustrate the operation of the magnetic film region when the applied field along the hard axis is in the negative direction and the small applied field along the easy axis to influence easy axis remanent magnetization is in the positive direction. The dashed line curves 23*b* and 24*d*** together illustrate the action of the magnetic film region when the applied hard axis field and the easy axis field are both in their respective negative directions.

Figure 5:
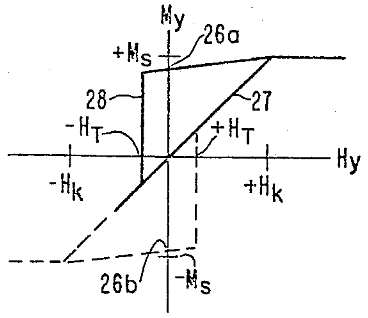
FIG. 5 is a magnetization-applied field curve similar to the curve of FIG. 3, as changed due to dispersion in the uniaxial anisotropic magnetic film region.

As explained in the copending Bertelsen et al. application, uniaxial anisotropic magnetic films are subject to dispersion, i.e., the easy axes in different domains of a film do not extend in the same direction. The angle of dispersion is defined as the maximum angular displacement occurring between any two easy axes in different domains of the film. As a result of dispersion, the ideal curves in FIGS. 3 and 4 do not apply. The easy axis hysteresis loop shown in FIG. 2 remains the same if the film region is operated at magnetic field switching speeds sufficiently high so that wall motion does not occur. The hard axis magnetization-applied field curve of FIG. 3 assumes the form of a loop, as shown in FIG. 5, exhibiting hysteresis and hence remanence at the points designated **26*a* and 26*b*. Thus an applied field along the hard axis of a strength greater than $+H_k$ saturates the magnetization at the value $+M_s$, and when the applied field is reduced to zero the magnetization is remanent at the point 26*a*. When there is no remanent magnetization and an applied field is first applied, the magnetization follows the sloping curve 27**, and maximum remanence is not achieved unless the field is driven beyond $+H_k$ or $-H_k$ and then brought to zero.

In FIG. 5, $H_t$ is the critical field of the magnetic film region and represents the applied field necessary to unlock the film, i.e., to change it from a state of remanence along the hard axis to almost no remanence along that axis. For example, when the magnetic film region is remanent along the hard axis at the point **26*a*, a field applied to the film along the hard axis in the negative direction and of a magnitude at least as great as $H_t$ drives the film through the vertical portion 28 of the curve of and onto the sloping portion 27. As long as the negative field is not of a magnitude greater than $H_k$, saturation at $-M_s$ in the negative direction along the hard axis will not occur. Hence when the negative field is removed, the operation is along the curve 27 and the hard axis magnetization goes to zero when the hard axis field reaches zero. Thereafter, the operation of the film is along the sloping curve 27 until the film is again driven into saturation by the application of a field beyond $+H_k$ or $-H_k$ to establish remanence at the points 26*a* or 26*b***, respectively.

Figure 6:
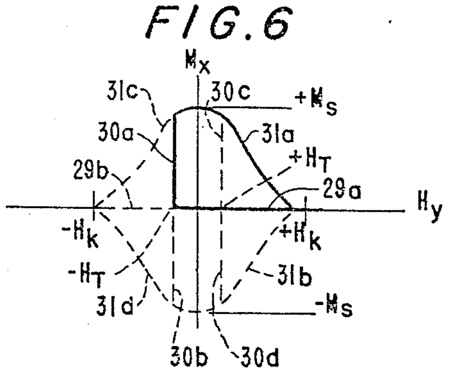
FIG. 6 illustrates cross field curves similar to the curves of FIG. 4, as changed due to dispersion in the uniaxial anisotropic magnetic film region.

When the magnetic field along the hard axis is unlocked from remanence, the mangetic film may assume a remanent magnetization in either direction along the easy axis, as indicated in FIG. 6. Referring to FIG. 6, it will be noted that this figure illustrates cross axis curves (magnetization along the easy axis versus applied field along the hard axis) similar to the curves of FIG. 4, changed, however, as a result of angular dispersion in the magnetic film region.

To explain FIG. 6, it is assumed at the outset that the magnetic film region is subjected to no applied fields either along the easy axis or along the hard axis, and that the dipoles in the region are oriented in both directions along the easy axis to present a net magnetization of zero along that axis. The magnetic state of the film is represented by the origin in FIG. 6. If a field is applied along the hard axis in the positive direction, for example, the magnetic diploles in the region are rotated in to a direction along the hard axis where the film becomes locked when the applied field exceeds $+H_k$. This is represented by the curve segment designated **29*a* in the figure, and it will be noted that the net magnetization along the easy axis remains zero. If the applied field along the hard axis is reduced to zero, the magnetization remains locked in the hard direction and the magnetic state is represented by the origin in FIG. 6 when the applied field has been reduced to zero. Remanent magnetization along the easy axis is zero, while it is at the point designated 26*a*** in FIG. 5 along the hard axis.

At this time, a small field is applied along the easy axis in the positive direction, for example, to influence the direction of easy axis magnetization. Next, a magnetic field is applied to the region along the hard axis in the negative direction, to proceed along the curve segment **29*a*** in FIG. 6 to the left of the origin. When the applied field along the hard axis reaches the magnitude $-H_t$, the magnetization along the hard axis unlocks and moves immediately along the curve segment 30A to result in remanent magnetization along the easy axis in the positive direction because of the small field applied along the easy axis. Upon the removal of the field along the hard axis, the magnetization is remanent at the value $+M_s$ along the easy axis, as indicated in FIG. 6.

If it is desired to return to a remanent magnetic state along the hard axis, a field is again applied along the hard axis in the positive direction, for example, so as to cause the magnetization to rotate from the remanent easy axis state $+M_s$ into the hard direction. The curve segment 31*a* in FIG. 6 represents this action. Concurrently, the small field along the easy axis is removed. When the hard axis field exceeds $+H_k$, the net easy axis magnetization is reduced to zero. Thereafter, the field along the hard axis is reduced to zero, and the magnetization follows the curve 29*a* to the origin, at which point the net easy axis magnetization is zero and the region is remanent along the hard axis represented by the point 26*a* in FIG. 5.

The curve 29*a* and the dashed curves 30*b* and 31*b* together illustrate the operation of the magnetic film region for a positive hard axis applied field but with a small easy axis field applied in the negative direction, all to produce remanent hard axis magnetization in the positive direction and unlocking with remanent easy axis magnetization in the negative direction. The dashed line curves 29*b*, 30*c* and 31*c* together illustrate the operation of the magnetic film region when the applied field along the hard axis is in the negative direction and the small field along the easy axis is in the positive direction, all to produce remanent magnetization in the negative direction along the hard axis and unlocking with remanent magnetization in the positive direction along the easy axis. The dashed line curves 29*b*, 30*d* and 31*d* together illustrate the action of the magnetic film region when the applied hard axis field and the easy axis field are both in their respective negative directions, to produce remanent magnetism along the hard axis in the negative direction and unlocking with remanent magnetization along the easy axis in the negative direction.

Figure 7:
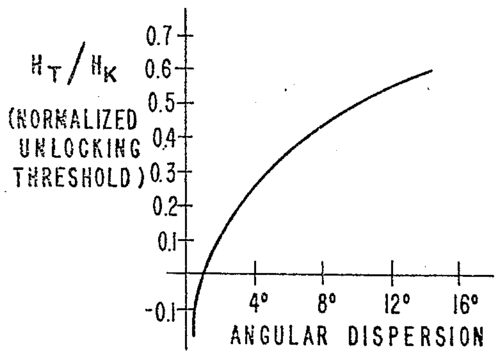
FIG. 7 is a typical curve showing $H_t/H_k$, the normalized unlocking threshold, versus angular dispersion for a uniaxial anisotropic magnetic film region exhibiting angular dispersion.

It will be noted from FIGS. 5 and 6 that $H_t$ represents the unlocking threshold necessary to unlock the film region from hard axis remanence. It has been found that as the angle of dispersion of the magnetic film increases, the magnitude of $H_t$ also increases. FIG. 7 shows the variation of $H_t/H_k$, which is a normalized unlocking threshold, versus angular dispersion for a typical magnetic film region. A negative value for $H_t/H_k$ indicates that the curve segment 28 in FIG. 5 is to the right of the $M_y$ axis, and not to the left of that axis as shown in the figure. Much less hard axis remanence is exhibited if such is the case, and this case is of no interest in the present invention.

In the present invention, the unlocking threshold $H_t$ is utilized advantageously so as to permit a magnetic film region to be switched out of remanence along the hard axis simply by the application of a field or fields to the region solely along the hard axis. In particular, the invention most advantageously utilizes a magnetic film which exhibits a relatively small angle of dispersion, in contrast with a film exhibiting a relatively large angle of dispersion as utilized in the copending Bertelsen et al. application referred to above. In particular, a magnetic film having a relatively small angle of dispersion in the neighborhood of 1° results in a relatively small critical field $H_t$ on the order of 0.01 oersted, while still exhibiting substantial remanence. Thus when the magnetic film is remanent along the hard axis, a small field of this order applied to the film along the hard axis and in a direction opposite from the direction of remanence along the hard axis is sufficient to unlock the film and switch it out of remanence along the hard axis. The magnetic field accompanying an electron beam is of this order, and hence the invention renders uniaxial anisotropic magnetic films operated in the dispersion locked mode applicable to many more applications than possible if a high amplitude field were required, as normally achieved through the use of current carrying conductors.

The unlocking and switching threshold may still be utilized by a relatively low strength switching field even when the threshold is relatively high, as in a film region exhibiting a relatively large angle of dispersion. In particular, a bias field along the hard axis in a direction opposite from the direction of remanence along that axis may be applied to bias the magnetic film region close to but not exceeding threshold. Hence an additional low amplitude control field in the same direction as the bias field may be employed, together with the bias field, to unlock the magnetic region and to switch it out of remanence along the hard axis. Such biasing renders the region effectively controllable by the small control field. It should be noted here, however, that the variation in unlocking threshold from one region to another in a magnetic film normally increases as the angle of dispersion increases. Hence, for uniformity of unlocking threshold, it is considered desirable to employ magnetic films exhibiting relatively low angles of dispersion.

FIG. 1 shows a representative system in accordance with the invention which takes into account the above considerations. The systems utilizes a uniaxial anistotropic magnetic film typically having a relatively low angle of dispersion and operated in the dispersion locked mode. A memory plane 32 is positioned within a housing designated generally at 34. The memory plane 32 is in the form of a rectangular slab having longitudinal bands 36–1, 36–2, 36–3 . . . 36–*n* thereon. Each of the bands comprises a magnetic film memory element whose different regions constitute bits for the storage of information. The construction of the entire memory plane 32 is best determined by reference to FIGS. 8A and 8B.

Figure 8A:
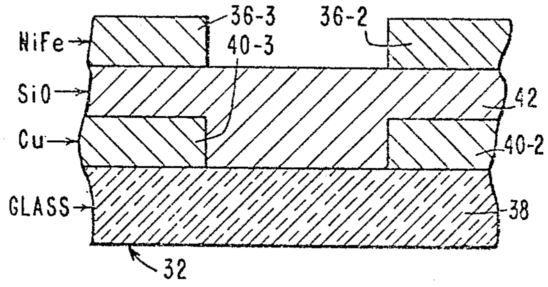
FIGS. 8A and 8B are enlarged sectional views of a portion of a magnetic film memory element useful in the system of FIG. 1.

As shown in FIG. 8A, which is a section of a portion of the memory plane 32 which includes the bands 36–2 and 36–3, the memory plane is formed with a glass base 38. Conductive strips 40–2 and 40–3 advantageously of copper are bonded to the glass base typically by deposition thereon in a complete sheet to cover the base, with subsequent etching to produce the individual strips. An insulation layer 42 advantageously of silicon monoxide is next added on top of the copper strips 40 typically by deposition. Upper bands 36–2 and 36–3 advantageously of nickel-iron magnetic film material are bonded to the insulation layer 42 typically by deposition in an entire sheet over the insulating layer, with subsequent etching to produce the individual bands.

Figure 8B:
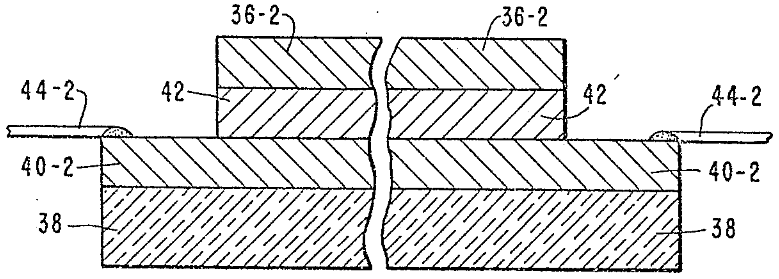

As shown in FIG. 8B, the base 38 and the conductive strip 40–2 extend forwardly and rearwardly beyond the layers 36–2 and 42 so that conductors 44–2 may be bonded to the conductive strip. Each of the conductive strips 40 is connected to an associated conductor 44 so that current may pass through the strip. The conductive strips 40 are used to provide a magnetic field when current passes therethrough, the field associated with each strip being localized to an associated one of the bands 36. In this fashion, the bands 36 may be selectively locked into remanence along the hard axis of the band. If desired, all the bands 36 may be together subjected to a single magnetic field to lock all of the regions of the bands in remanence along the hard axes of the bands by the use of a suitable magnetic field extending over the entire memory plane 32 in FIG. 1, as provided by coils 52 and 54 energized by a suitable source (not shown).

As shown in FIG. 1, the memory plane 32 is positioned within the housing 34 so that an electron beam 46 from an electron beam assembly 47 may impinge thereon. The electron beam assembly is similar to that described in Schlesinger, "A Microspot Tube with Very High Resolution," IRE Transactions on Electron Devices, pp. 281–287 (May 1962), and described in more detail in Schlesinger, "Design Development, and Fabrication of an Ultra-High-Resolution Cathode-Ray Tube," Report No. 2, Sec- Quarterly Progress Report, Aug. 21, 1962 through Nov. 20, 1962, Contract DA 36–039 SC–90726, Technical Requirements—SCL–7001/69, dated Nov. 8, 1961, DA Task No. 3A99–13–002–04 (copy available through the Armed Services Technical Information Agency, Arlington Hill Station, Arlington, Va.).

In the electron beam assembly 47, the beam of electrons is generated by a microgun 48 and is deflected by a deflection yoke 50. The deflection yoke is controlled by signal circuits (not shown) which serve to position the beam accurately so that it impinges upon a selected region of one of the bands 36–1, 36–2, 36–3 . . . **36–*n* on the memory plane 32** which corresponds to a particular bit of information.

Prior to the impingement of the electron beam upon the memory plane 32, the memory plane is momentarily subjected to a strong magnetic field, as produced by the coils 52 and 54 or by current passing through selected ones of the conductors 44. The field or fields are in the direction of the hard axes of the magnetic film bands 36 forming the memory plane, and serve to establish a remanent magnetization along the hard axis of each or selected ones of the regions of the strips after the removal of the field or fields. All or selected regions thus are each set to a magnetic state corresponding to a binary value or zero, for example. The electron beam 46 striking one of the bands 36 at a particular region therein serves to unlock this hard axis remanence and to establish remanence along the easy axis of the region in one or both directions along that axis, representative of a binary value of one, as explained with reference to FIG. 9.

Figure 9:
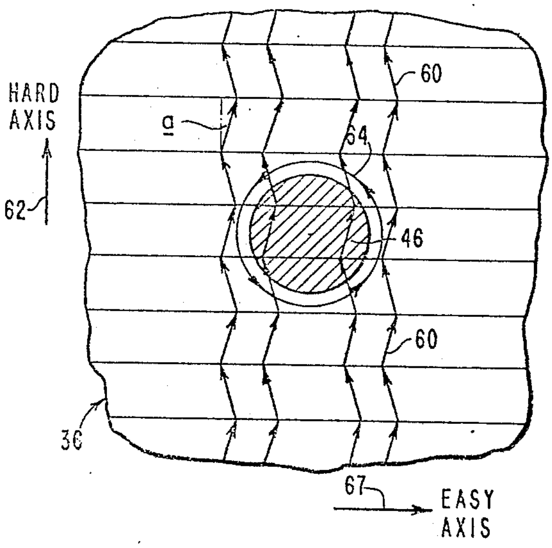
FIG. 9 is a greatly enlarged view of a region in a uniaxial anisotropic magnetic film illustrating the action of an electron beam in changing the remanent magnetization of the region to record information in the region.

Referring to FIG. 9, a segment of one of the bands 36 is shown. Arrows 60 designate the remanent magnetization in the band, which is shown locked in the direction of the average hard axis 62 of the magnetic film. The arrows 60 are not in line with the average hard axis 62 but form an angle *a* with that axis. The angle *a* represents the dispersion in the film.

The electron beam 46 impinging upon the strip 36 has associated therewith a magnetic field represented by vector 64 encircling the beam. The beam vector 64 is in the same general direction as the remanent magnetization vectors 60 on the right-hand side of the beam. At the left-hand side of the beam, the beam vector 64 is generally opposite from the remanent magnetization vectors 60. At the top and bottom portions of the beam, the beam vector 64 is generally at right angles to the remanent magnetization vectors 60. It is apparent, then, that at the left-hand side of the beam 46, as shown in FIG. 9, the field of the beam opposes the remanent magnetization in the region of the strip and thus unlocks the region from remanence along the hard axis. Specifically, referring to FIG. 6, the magnetic field of the electron beam exceeds the critical field $H_t$ and switches the region out of hard axis remanence, as explained with reference to that figure.

Figure 10:
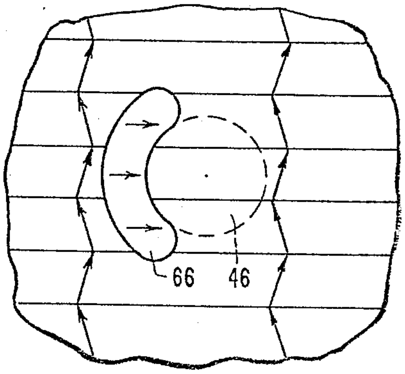
FIG. 10 is a greatly enlarged view showing a region in in a uniaxial anisotropic magnetic film constituting a "bit" for the storage of information.

If, then, a "bit" for the storage of information is assumed to take the form of region 66 shown in FIG. 10, then the region will be unlocked from a state of remanent magnetism along its hard axis when the beam 46 impinges upon the region as shown, and will "set" the region to a binary value of one.

Unlocking the region from its hard axis remanence renders the region susceptible to remanence along either direction or split into both directions of easy axis 67 in FIG. 9. Bias fields such as provided by additional biasing coils 68 and 70 in FIG. 1, energized by a suitable source (not shown), may be employed to determine which direction along the easy axis the remanent magnetism assumes when the region is unlocked from its remanent state along the hard axis by the beam 46.

In FIG. 1, the electron beam 46 is caused to scan over the bands 36 of the memory plane 32 and to change the magnetic state of selected regions in the bands to record information in binary form. Following this recordation of information, the memory plane may be read out by any suitable arrangement. FIG. 1 shows one such arrangement which incorporates optical readout techniques. In particular, a laser 71 generates a beam 72 of polarized light which passes through a deflector control 74, which may advantageously comprise calcite light deflectors. The deflector control 74 is controlled by circuitry (not shown) which determines where upon the memory plane 32 the beam of polarized light impinges. A lens 76 serves to focus the beam of light on the memory plane.

Light from the lens 76 is reflected from the memory plane 32 to an analyzer 78. The manner in which the light is reflected is dependent upon the magnetic state of the region of the magnetic film upon which the light beam impinges. In particular, the plane of the polarized light is rotated different degrees depending upon whether the magnetism is along the hard axis in the film or along the easy axis. The analyzer 78 may be arranged so that it transmits light reflected from the memory plane 32 only when that light has been reflected from a region whose remanent magnetization is along the easy axis and thus is representative of a binary value of one. A photomultiplier 80 detects the light transmitted by the analyzer 78 and generates a suitable signal representative of the state of the film region interrogated by the light beam.

As noted above, the system of FIG. 1 advantageously incorporates a uniaxial anisotropic magnetic film typically having a relatively low angle of dispersion. As a result, the magnetic field of the electron beam 46 is sufficient by itself to unlock the regions of the bands 36 in the memory plane out of remanence along the hard axis. If the angular dispersion in the bands is sufficiently great so that the magnetic field of the beam is not sufficient to unlock each region by itself, a bias field may be employed encompassing the entire memory plane 32. Such a field may be provided by the coils 52 and 54 to provide a field along the hard axis opposite to the direction of remanent magnetism along that axis in each of the regions. The magnitude of the bias field, however, is less than $H_t$, the unlocking threshold (FIG. 6), and hence each of the regions is switched only when the magnetic field of the electron beam 46 is combined with the bias field to exceed the unlocking threshold.

Figure 11:
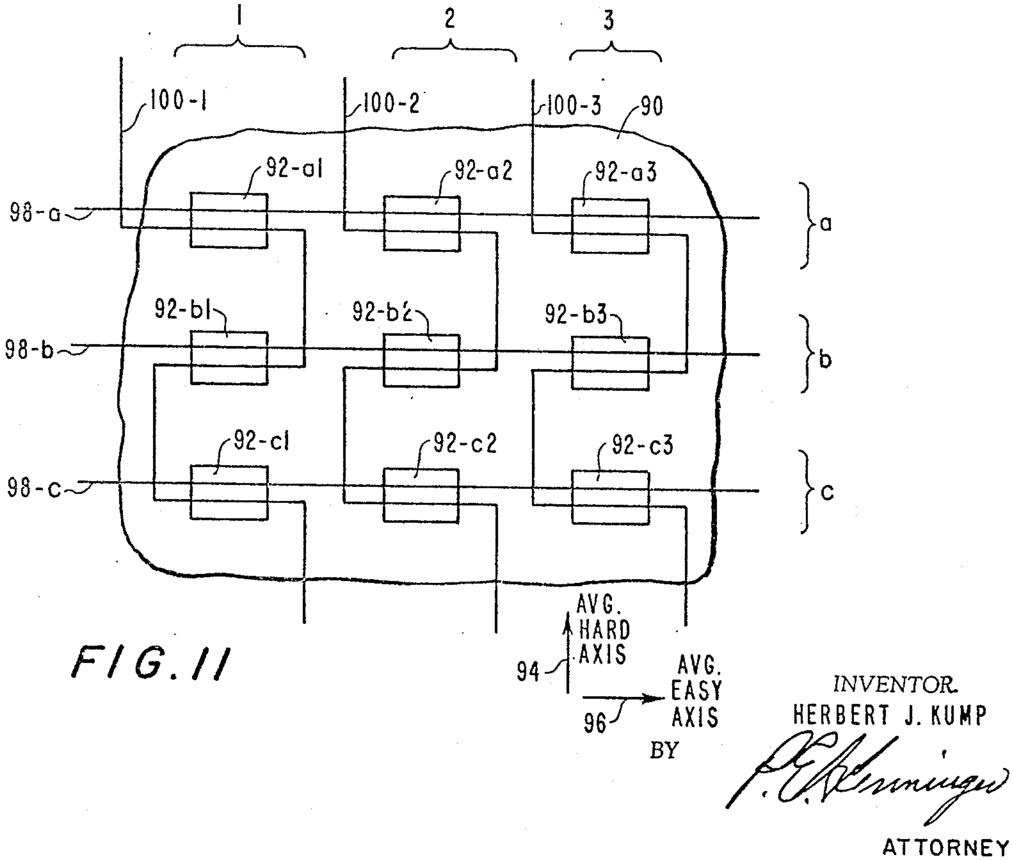
FIG. 11 shows a matrix or array of memory areas formed from uniaxial anisotropic magnetic film in which information is recorded and read out through the use of signals passing through electrical conductors adjacent the memory areas.

FIG. 11 shows an arrangement utilizing a uniaxial anisotropic magnetic film in which information is recorded and read out through the use of signals on electrical conductors rather than a recording electron beam and an optical readout system as in FIG. 1. The arrangement includes a uniaxial anisotropic magnetic film 90 which is divided into a matrix or array of regions 92. The regions are shown arranged in rows *a*, *b* and *c* and columns 1, 2 and 3; the number of columns and rows is arbitrary. The regions 92 are designated by row and column; for example, the region in the exact center of the film 90 is designated **92–*b*2. The hard axes of the regions 92 all extend generally in the direction of average hard axis 94. Similarly, the easy axes of the film regions all extend generally in the direction of average easy axis 96**.

Conductors **98–*a*, 98–*b* and 98–*c* extend by the regions 92, each conductor passing by all the regions in a single row in the direction of the average easy axis 96. A current in one of the conductors produces a magnetic field through the regions of the row of that conductor in the direction of the average hard axis 94**.

Conductors 100–1, 100–2 and 100–3 also extend by the magnetic film regions 92, each conductor being associated with all the regions in a single column. Any conductor passes through all regions in a column in a direction along the average easy axis 96. It will be noted, however, that a current flowing through any conductor produces magnetic fields oriented in both directions along the average hard axis 94. For example, a current flowing downwardly through the conductor 100–2 passes by the film region 92–*a*2 from left to right, producing an upwardly directed magnetic field through that region. The same current passes by the magnetic film region 92–*b*2 from right to left, however, producing a downwardly directed magnetic field through the region. It is apparent, then, that the magnetic fields produced by current flowing in any of the conductors 100 are directed alternately upwardly and downwardly for successive regions.

Any conductor 98 and any conductor 100 together pass through only one of the regions 92. For example, the conductor 98–*b* and the conductor 100–2 together pass through only the region 92–*b*2. Thus the conductors 98 and 100 may be paired to select any region in the memory matrix.

At the outset, it is assumed that remanent magnetization along the hard axis in a downward direction in any one of the regions 92 corresponds to a binary value of one. Remanent magnetization in one direction along the easy axis in a region, or if the dipoles in a region are oriented in both directions along the easy axis, is assumed to correspond to a binary value of zero. It is assumed that all of the regions 92 are initially in the zero state.

Selected ones of the regions 92 are established in remanent magnetization directed downwardly along the average hard axis 94, corresponding to binary values of one, by the applicaton of currents to selected ones of the conductors 98 and 100. For example, if it is desired to record a binary one in the region 92–*b*2, a current is passed through the conductor 98–*b* from right to left and another current is passed downwardly through the conductor 100–2. The currents in these conductors together pass by the region 92–*b*2 from right to left and produce a downwardly directed magnetic field along the average hard axis 94. The currents in the conductors together generate a field along the average hard axis that is greater than $H_k$ with reference to FIGS. 5 and 6, so that the region 92–*b*2 is locked in remanent magnetization directed downwardly along the hard axis. Either current by itself is insufficient to generate a field exceeding $H_k$, and hence only that region by which the current carrying conductors pass is established in remanence along the hard axis.

Readout of the memory array is accomplished through the use of the conductors 98 and 100. If it is desired to detect the magnetic state of the region 92–*b*2, for example, a readout current is passed upwardly through the conductor 100–2. The current is of a sufficient magnitude to generate an upwardly directed magnetic field along the average hard axis 94 which is greater than $H_t$, with reference to FIG. 6. Hence if the region 92–*b*2 is locked in remanent magnetization downwardly along the hard axis, the field produced by the readout current unlocks the region and orients the dipoles in the region along the easy axis. The decrease of remanent magnetization along the hard axis in the region 92–*b*2 causes a current pulse to be generated in the conductor 98–*b*, which may be sensed by any appropriate sensing device (not shown), to indicate that the region 92–*b*2 previously was in a magnetic state corresponding to the binary value of one. If the dipoles in the region 92–*b*2 were already oriented along the easy axis, corresponding to a binary value of zero, no change in remanent magnetization along the hard axis would be produced and hence no signal would be produced in the conductor 98–*b*. The readout is "destructive"; that is, following readout the regions are established each in a binary state of zero regardless of their states prior to readout.

It will be noted that the magnetic fields accompanying the readout pulse in any of the conductors 100 cause current pulses to be generated in all of the conductors 98. Each pulse so generated, however, is substantially less in magnitude than the pulse which is generated in one of the conductors by a region being unlocked from remanence along the hard axis. These different pulses may be discriminated by magnitude, so that an output indication is provided only when a region is unlocked from remanence along the hard axis.

In the memory array of FIG. 11, it is apparent that binary values of one are established in the regions by selectively pulsing appropriate pairs of the conductors 98 and 100 with currents passing by the regions in one direction, together to produce fields exceeding $H_k$. Readout is accomplished by pulsing one of the conductors with a current sufficient to produce a field between $H_t$ and $H_k$ in a direction opposite from the field that set the region to a binary value of one.

In the above description it has been assumed that inasmuch as the regions 92 are established in binary states of zero following readout, it is not necessary to provide for the establishment of these states in selected ones of the regions. Such selective setting to zero, however, may be desirable in some instances, and this is achieved as follows. Considering the region 92–*b*2 as an example, the region is set to a binary value of zero from a binary value of one by passing a current through the conductor 98–*b* from left to right and another current upwardly through the conductor 100–2. The currents through these conductors pass by the region 92–*b*2 from left to right and produce a combined magnetic field directed upwardly along the average hard axis 94. The currents in the conductors generate together a field that unlocks the region from remanent magnetization directed downwardly along the hard axis. Referring to FIG. 6, the combined field of the currents in the conductors 98–*b* and 100–2 must be at least as great as the critical field $H_t$ and less than $H_k$. The current in one of the conductors 98 or 100 is alone insufficient to produce a magnetic field which exceed $H_t$ in FIG. 6. Hence only the region corresponding to the pair of conductors 98 and 100 carrying current is unlocked from any downwardly directed hard axis remanent magnetization.

It will be noted that a uniaxial magnetic film suitable for the practice of the present invention is advantageously characterized by a relatively small angle of dispersion so that, with reference to FIG. 6, the critical field $H_t$ is relatively small while at the same time the hysteresis curve of the film exhibits substantial remanent magnetization along the hard axis. Such a film may be produced by vacuum deposition, typically as set forth in detail in the copending Bertelsen et al. application. The dispersion technique as described in that application involves the use of a substrate which is heated and upon which a layer of chromium is deposited to provide for good adhesion of subsequent layers. Next, silicon monoxide is deposited for surface smoothness and uniformity of surface cleanliness. Following this, a nickel-iron coating, which serves as the magnetic film, is deposited in the presence of a D.C. magnetic field applied parallel to the intended easy axis and maintained until the substrate is cooled after the completion of deposition.

The angle of dispersion in nickel-iron films may be controlled and reduced to a relatively low value suitable for the practice of the present invention by appropriate regulation of any of the following factors:

(1) The temperature of the substrate during deposition. See A. J. Hardwick, "Interrelationship of Substrate Temperature and Angle of Incidence Effects Upon Anisotropy Variations in Evaporated Nickel-Iron Thin Films," Journal of Applied Physics, 34, No. 4, Part 1, p. 818 (April 1963), and J. Engleman and A. J. Hardwick, American Vacuum Society 1962 Proceedings, p. 103.

(2) Roughness of the substrate surface.

(3) The rate of deposition of the nickel-iron magnetic film. See J. Engleman and A. J. Hardwick, American Vacuum Society 1962 Proceedings, p. 103.

(4) The addition of impurities into the magnetic film, such as chromium, copper and molybdenum. See K. Y.

Ahn, W. R. Beam, "Properties of Molybdenum Permalloy Films," 9th Annual Conference Magnetism and Magnetic Materials, Atlantic City, November 1963.

(5) Changing the deposition field direction during the formation of the magnetic film.

(6) The time during which the magnetic film is maintained at a relatively high temperature after deposition.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a magnetic memory incorporating a uniaxial anisotropic magnetic element, the combination comprising first means for directing a first magnetic field to the element along a hard axis of the element to establish a remanent magnetization along the hard axis, and second means for directing a second magnetic field to the element in a direction generally opposite from the direction of the first field to unlock the element from remanence along the hard axis.

2. A memory as recited in claim 1, wherein the second means comprises means for causing an electron beam to impinge upon the element to unlock the element from remanence along the hard axis by the magnetic field accompanying the electron beam.

3. A memory as recited in claim 1, wherein the second means comprises conductor means in magnetic relation to the element to apply a magnetic field to the element upon the passage of a current through the conductor means.

4. A memory as recited in claim 1, including biasing means for applying a relatively small magnetic bias field to the element in one direction along the easy axis of magnetization of the element.

5. In a magnetic memory incorporating a uniaxial anisotropic magnetic element locked in remanence along a hard axis, the combination comprising means for applying to the element a magnetic field in a direction generally opposite from the direction of the remanent magnetization along the hard axis to unlock the element from remanence along the hard axis, and means for detecting the magnetic state of the element.

6. In a magnetic memory incorporating a uniaxial anisotropic magnetic element locked in remanence along a hard axis and exhibting an unlocking magnetic field threshhold $H_t$ and magnetic saturation at a magnetic field $H_k$, the combination comprising means for applying to the element a magnetic field in a direction generally opposite from the direction of the remanent magnetization along the hard axis and of a magnitude at least as great as $H_t$ but less than $H_k$ to unlock the element from remanence along the hard axis, and means for detecting the magnetic state of the element.

7. In a magnetic memory incorporating a uniaxial anisotropic magnetic element locked in remanence along a hard axis and exhibiting an unlocking magnetic field threshold $H_t$, the combination comprising means for applying to the element a bias magnetic field in a direction generally opposite from the direction of the remanent magnetization along the hard axis and of a magnitude less than $H_t$, and means for applying to the element a control magnetic field generally in the same direction as the bias magnetic field and of a magnitude which when added to the magnitude of the bias magnetic field exceeds $H_t$ so as to unlock the element from remanence along the hard axis.

8. In combination, a region of a uniaxial anisotropic film of magnetic material, the region exhibiting angular dispersion so that remanent states of magnetization may be established oriented along intersecting hard and easy axes, means for applying a first magnetic field to the region oriented in a first direction generally along the hard axis and of sufficient intensity to establish a remanent state of magnetization oriented in the first direction along the hard axis, and means for applying a second magnetic field to the region oriented generally in the opposite direction along the hard axis and of sufficient intensity to remove the remanent magnetization along the hard axis in the first direction but of insufficient intensity to estabish remanence in the opposite direction along the hard axis, thereby to allow the region to assume remanent magnetization along the easy axis.

9. Apparatus as recited in claim 8, including means for applying a third magnetic field to the region oriented generally along the easy axis and of insufficient intensity to change the remanent magnetization in the region but of sufficient intensity to determine the direction along the easy axis and of insufficient intensity to change the remanent magnetization in the region but of sufficient intensity to determine the direction along the easy axis that the remanent magnetization assumes when the region is switched out of remanence along the hard axis.

10. Apparatus as recited in claim 8, wherein the means for applying the first magnetic field to the region comprises a conductive strip in a magnetic relation to the region to apply a magnetic field to the region upon the passage of a current through the conductive strip.

11. The method of establishing a remanent state of magnetization along an easy axis of a uniaxial anisotropic magnetic element locked in remanence along a hard axis, comprising the step of applying to the element a magnetic field in the direction generally opposite from the direction of the remanent magnetization along the hard axis to unlock the element from remanence along the hard axis.

12. The method as recited in claim 11, including the step of applying a bias field in one of two directions along the easy axis to determine the direction of the remanent magnetization along the easy axis when the element is unlocked from remanence along the hard axis.

13. The method as recited in claim 11, wherein the magnetic field applied along the hard axis to unlock the element from remanence along the hard axis is supplied by an electron beam.

14. The method as recited in claim 11, wherein the magnetic field applied along the hard axis to unlock the element from remanence along the hard axis is supplied by conductor means in magnetic relation to the element, the magnetic field being produced upon the passage of a current through the conductor means.

15. The method of establishing a remanent state of magnetization along an easy axis of a uniaxial anisotropic magnetic element locked in remanence along a hard axis and exhibiting an unlocking magnetic field threshold $H_t$ and magnetic saturation at a magnetic field $H_k$, comprising the step of applying to the element a magnetic field in a direction generally opposite from the direction of the remanent magnetization along the hard axis and of a magnitude at least as great as $H_t$ but less than $H_k$ to unlock the element from remanence along the hard axis.

16. The method of establishing a remanent state of magnetization along an easy axis of a uniaxial anisotropic magnetic element locked in remanence along a hard axis and exhibiting an unlocking magnetic field threshold $H_t$, comprising the steps of applying to the element a bias magnetic field in a direction generally opposite from the direction of the remanent magnetization along the hard axis and of a magnitude less than $H_t$, and applying to the element a control magnetic field generally in the same direction as the bias magnetic field and of a magnitude which when added to the magnitude of the bias magnetic field exceeds $H_t$ so as to unlock the element from remanence along the hard axis.

References Cited

Journal of Applied Physics, vol. 33, No. 10, October 1962, pp. 2968–2979.

JAMES W. MOFFITT, Primary Examiner